(12) United States Patent
Wakizaka

(10) Patent No.: US 6,487,192 B1
(45) Date of Patent: Nov. 26, 2002

(54) FREQUENCY CONTROL METHOD IN A CDMA COMMUNICATION SYSTEM FOR PREVENTING DETERIORATION IN COMMUNICATION QUALITY DESPITE FAILURE TO CONTROL OF TRANSMISSION POWER IN A MOBILE STATION

(75) Inventor: Yoshiki Wakizaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/356,680

(22) Filed: Jul. 19, 1999

(30) Foreign Application Priority Data

Jul. 24, 1998 (JP) ............................ 10-209810

(51) Int. Cl.[7] .............................................. H04B 7/005
(52) U.S. Cl. ...................... 370/342; 370/335; 455/522; 455/63
(58) Field of Search ................... 455/522, 69, 71, 455/421, 67.1, 67.3, 63, 572, 574, 518; 370/311, 335, 342

(56) References Cited

U.S. PATENT DOCUMENTS

| 4,373,206 | A | | 2/1983 | Tomokazu et al. | |
| 6,081,727 | A | * | 6/2000 | Kondo | 455/522 |
| 6,167,240 | A | * | 12/2000 | Carlsson et al. | 455/67.3 |
| 6,246,891 | B1 | * | 6/2001 | Isberg et al. | 455/574 |

FOREIGN PATENT DOCUMENTS

| CA | 2127672 A1 | 1/1995 |
| EP | 0 713 300 A1 | 5/1996 |
| EP | 0 880 239 A2 | 11/1998 |
| JP | 8-335904 | 12/1996 |
| JP | 9-247085 | 9/1997 |
| JP | 9-284827 | 10/1997 |
| JP | 10-23502 | 1/1998 |
| JP | 10-66133 | 3/1998 |
| JP | 10-215219 | 8/1998 |
| JP | 10-303810 | 11/1998 |
| JP | 10-322268 | 12/1998 |

* cited by examiner

Primary Examiner—Lester G. Kincaid
(74) Attorney, Agent, or Firm—Sughrue Mion, PLLC

(57) ABSTRACT

A frequency control method in a CDMA communication system is described that prevents deterioration in communication quality even in cases in which a mobile station loses control of transmission power. A mobile station is determined to have failed when the difference between the reception Eb/I0 and a reference Eb/I0 exceeds a large predetermined value, whereupon the base station instructs the mobile station to turn off its power supply. If the power supply of that mobile station cannot be confirmed to be off, the base station instructs the mobile station to change its frequency. If the frequency change of that mobile station cannot be confirmed, the base station instructs normal mobile stations other than the failed mobile station to change frequency.

5 Claims, 5 Drawing Sheets

FREQUENCY CONTROL METHOD IN A CDMA COMMUNICATION SYSTEM FOR PREVENTING DETERIORATION IN COMMUNICATION QUALITY DESPITE FAILURE TO CONTROL OF TRANSMISSION POWER IN A MOBILE STATION

BACKGROUND OF THE INVENTION

1. Field of the Invention

The present invention relates to a CDMA (Code Division Multiple Access) Communication System, and more particularly to a frequency control method for controlling the frequency of channels established between the base station and a mobile station.

2. Description of the Related Art

In recent years, the CDMA communication method, which is effective in controlling interference and disturbance, is receiving increasing attention as a communication method used in mobile communication systems. In such a CDMA communication method, a user signal that is to be transmitted is spread by a spreading code on the transmission side to be transmitted, and the original user signal is obtained on the receiving side by using a spreading code identical to the spreading code for despreading.

In the CDMA communication system, a plurality of transmission sides effect spreading by using different spreading codes each having orthogonality, and at the receiving sides, each communication can be identified by selecting the spreading code which is used at despreading, thereby enabling a plurality of communications sharing the same frequency band.

However, since it is difficult to maintain absolute orthogonality between all of the spreading codes that are used, each of the spreading codes are actually not perfectly orthogonal and have correlation components with other codes. These correlation components become interference components in that communication and bring about deterioration in communication quality. This produces an interference component which increases with an increase in the number of communications.

In general, a certain signal-to-noise ratio is needed in a radio communication system to secure communication quality. For example, in a spread spectrum communication system, a certain signal-to-(noise+interference) ratio is needed to secure communication quality. This value is usually referred to as Eb/I0, where Eb is a desired reception wave power and I0 is an interference wave power. The Eb/I0 needed to secure the certain communication quality is also referred to as a required Eb/I0.

As described hereinabove, however, for one particular receiver, transmission signals sent to another receiver are noise components and generate interference to the desired signals transmitted to the receiver. As a result, Eb/I0 can be secured most efficiently when the powers of a plurality of transmission signals received at a receiver are all the same. For this reason, in a CDMA communication system, the base station controls the transmission power of each mobile station such that the Eb/I0 obtained from the communications of each of the mobile stations reaches a reference Eb/I0. The reference Eb/I0 is a value that is set based on a required Eb/I0, and is typically substantially equal to the reference Eb/I0.

Specifically, the base station instructs each mobile station to increase or decrease the present transmission power based on transmission power control signals for instructing the increase or decrease of transmission power to mobile stations contained in the downward channel transmitted from the base station to mobile stations.

However, when a failure occurs at a mobile station, the control of transmission power may be impossible, and in some cases transmission power continues to rise regardless of the transmission power control by the base station.

When this happens, the reception Eb/I0 of mobile stations other than the mobile station in which the failure occurred is degraded by the influence of the communication of the mobile station in which failure occurred, so that the reference Eb/I0 can no longer be secured. Therefore, the base station instructs each mobile station in which failure has not occurred to increase transmission power of the mobile station, and each mobile station performs communications at a transmission power greater than needed at each mobile station, thus shortening the battery life. In a worst case, all mobile stations within a cell communicate at the greatest transmission power that can be transmitted. As a result, the required Eb/I0 cannot be obtained at all mobile stations within the cell, making all mobile stations within the cell lose the ability to communicate.

In other words, the CDMA communication system of the prior art has suffered from problem that, should control of transmission power be lost at any particular mobile station and transmission power rise to an unnecessarily high level, transmission quality at other mobile stations within the cell can no longer be maintained.

SUMMARY OF THE INVENTION

It is an object of the present invention to provide a frequency control method in a CDMA communication system in which, even when a particular mobile station loses control of transmission power and hence an undesired interference wave is produced within the cell, this interference wave does not cause deterioration in the communication quality of other mobile stations in which failure has not occurred.

To achieve the aforementioned object, in the frequency control method in a CDMA system according to the invention, a CDMA base station determines that a particular mobile station has failed to control of transmission power if the difference between a reference Eb/I0 and the reception Eb/I0 of the communication channel that is established between the base station and the mobile stations has exceeded a predetermined value, and instructs the mobile station to turn off its power supply.

In the present invention, a CDMA base station instructs a particular mobile station to turn off its power supply in the event of a failure at that mobile station that loses control of transmission power, causing the transmission power of that mobile station to rise above the necessary level. The invention thus prevents deterioration in the communication quality of other normal mobile stations in which failures have not occurred due to the influence of transmission signals from the problem mobile station. In addition, the invention provides a solution to the problem of shortened battery life when a particular mobile station loses control of transmission power and other normal mobile stations communicate at transmission power greater than the necessary transmission power.

In another frequency control method in a CDMA system of the invention, a CDMA base station determines that a particular mobile station has failed to control of transmission power if the difference between a reference Eb/I0 and the reception Eb/I0 of the communication channel established between the base station and the mobile stations has exceeded a predetermined value, and instructs that particular mobile station to change the frequency used as the communication channel to another frequency.

In this invention, a CDMA base station instructs a particular mobile station to change the frequency used as the communication channel to another frequency when a failure has occurred at that particular mobile station, so that mobile station loses control of transmission power, and the transmission power of that mobile station rises above the necessary transmission power. The invention thus prevents deterioration in the communication quality of other normal mobile stations in which failures have not occurred caused by the influence of transmission signals from that mobile station.

In addition, according to another frequency control method in a CDMA system of the present invention, a CDMA base station determines that a particular mobile station has failed to control of transmission power if the difference between a reference Eb/I0 and the reception Eb/I0 of the communication channel established between the base station and the mobile station has exceeded a predetermined value, and instructs normal mobile stations other than that particular mobile station to change the frequency used as the communication channel to another frequency and also change the frequency used as the communication channel to the another frequency.

In this invention, when a failure occurs at a particular mobile station, so that the particular mobile station loses control of transmission power, and the transmission power of that mobile station rises above the necessary transmission power, a CDMA base station instructs normal mobile stations within the cell other than that mobile station to change the frequency used as the communication channel to another frequency and also change the frequency used as the communication channel to the another frequency. Accordingly, even when instructions from the base station can not be received by the mobile station that has failed to control of transmission power, deterioration in communication quality due to the influence of transmission signals from that mobile station can be prevented for other normal mobile stations in which no problems are occurred.

According to another frequency control method in a CDMA system of the present invention, a combination of any two or all three of the foregoing frequency control methods may be used.

According to the present invention, if the power supply of a mobile station in which a failure has occurred does not turn off despite instructions from the base station, the frequency used as the communication channel by that mobile station is changed; and if the frequency change is impossible, the frequency employed as the communication channel by other normal mobile stations and the CDMA base station is changed to another frequency. Thus, by using a method depending on the severity of the problem that has occurred in the mobile station that has failed to control of transmission power, the invention can prevent deterioration in communication quality in other normal mobile stations in which problems have not occurred caused by the influence of transmission signals from that mobile station.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
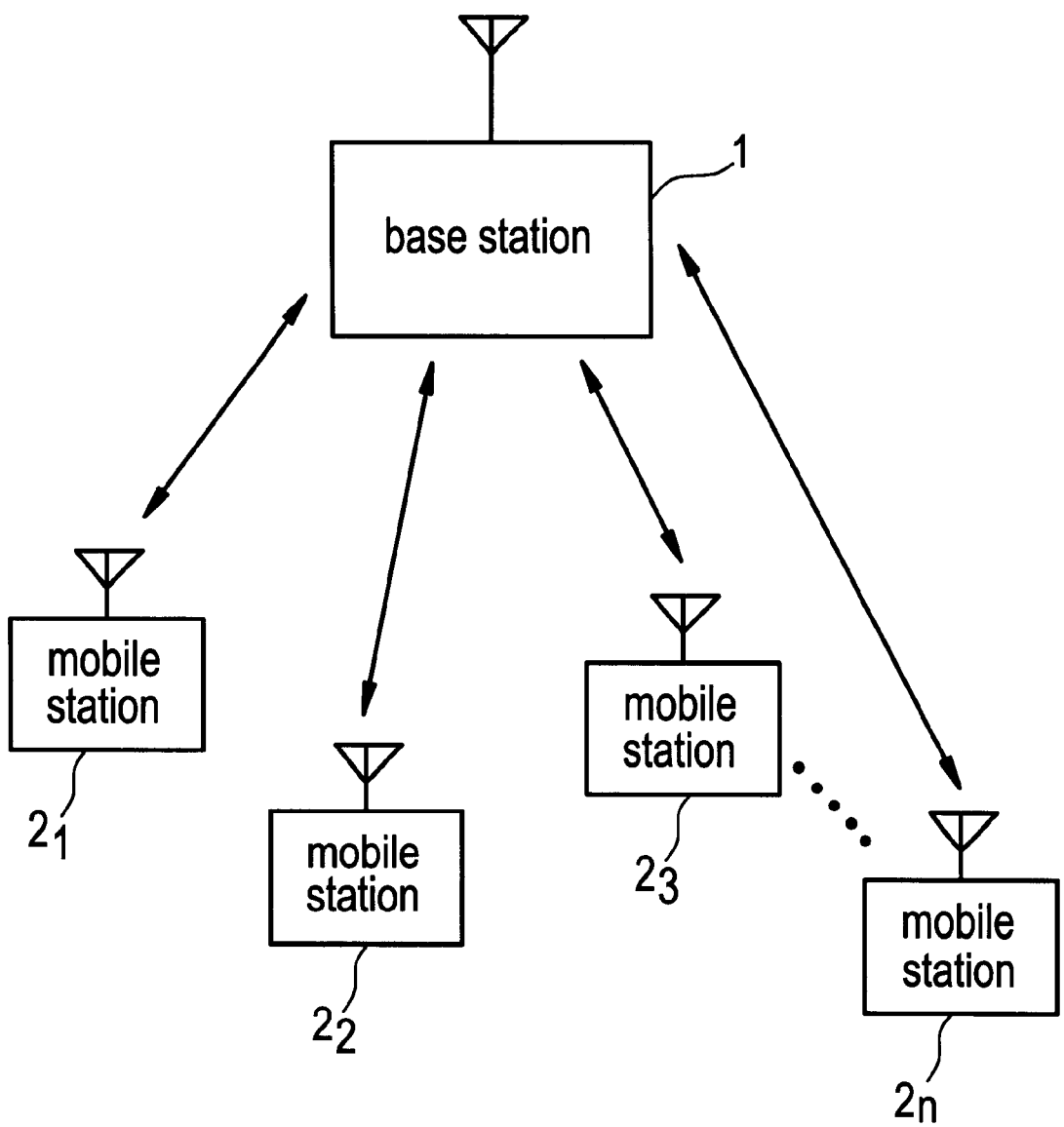
FIG. 1 is a block diagram showing the construction of a typical CDMA communication system.

Referring to FIG. 1, a typical CDMA communication system comprises a base station 1 and a plurality of mobile stations $2_1-2_n$. Mobile stations $2_1-2_n$ each communicate with base station 1 based on a CDMA system by establishing a communication channel of the same frequency between mobile stations $2_1-2_n$ and base station 1. Base station 1 and mobile stations $2_1-2_n$ are of a generally known construction, and detailed description of their compositions is therefore herein omitted.

First Embodiment

The operation of the CDMA communication system of this embodiment will be described with reference to the flow chart shown in FIG. 2, by way of example in which a failure has occurred in mobile station $2_1$ within a service area, so that control of transmission power is lost, and the transmission power can no longer be decreased.

When signals transmitted from mobile stations $2_1-2_n$ are received at base station 1 at step 101, base station 1 compares reception Eb/I0 of signals transmitted from mobile stations $2_1-2_n$ with the value of a reference Eb/I0 previously set by the system, and includes a transmission power control (TPC) signal to lower the transmission power in transmission signals from base station 1 if the reception Eb/I0 is higher than the reference Eb/I0.

In step 102, when signals transmitted from base station 1 are received at mobile stations $2_1-2_n$, mobile stations $2_1-2_n$ analyze the transmission power control signals transmitted from base station 1, and transmits a signal at decreased transmission power if instructed to decrease transmission power.

Thus, increasing and decreasing the transmission power of mobile stations $2_1-2_n$ makes it possible to control the reception Eb/I0 in the communication channel between base station 1 and each of mobile stations $2_1-2_n$ converge with the reference Eb/I0 set in advance by the system.

In step 103, base station 1 makes a check to determine if the difference between the reference Eb/I0 and the reception Eb/I0 of mobile stations $2_1-2_n$ at base station 1 is greater than a particular value "a". If it is found the difference between the reference Eb/I0 and the reception Eb/I0 at base station 1 of a particular mobile station $2_1$ exceeds a particular value "a" in step 103, then base station 1 determines that mobile station $2_1$ has failed to control of transmission power. In this case, value "a" is a relatively large value, i.e., a value that would not be obtained if transmission power control is being carried out normally. In step 104, base station 1 then transmits an instruction to mobile station $2_1$, which has failed to control of transmission power, to turn off its power supply.

The power supply of mobile station $2_1$ is then turned off in accordance with the "power supply off" instruction from base station 1, thereby allowing prevention of deterioration of communication quality of the other normal mobile stations $2_2$–$2_n$ caused by transmission signals from mobile station $2_1$. In addition, the problem that battery life is shared by the fact that other normal mobile stations $2_2$–$2_n$ communicate at transmission power that is greater than necessary, can thus be solved even when control of transmission power becomes impossible at mobile station $2_1$.

Second Embodiment

Figure 3:
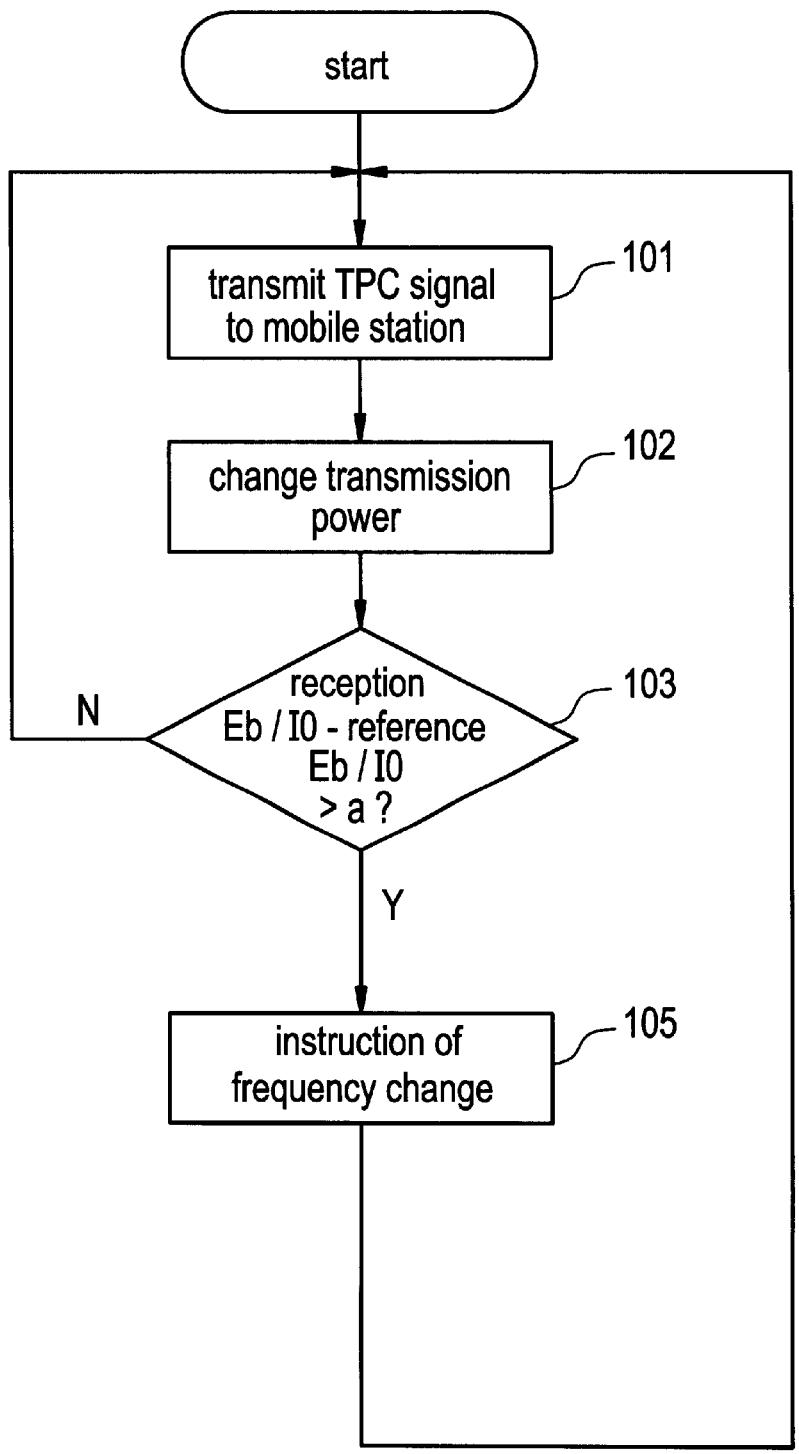
FIG. 3 is a flow chart showing the operation of a CDMA communication system according to a second embodiment of the present invention.

A frequency control method in a CDMA communication system according to the second embodiment of the present invention is next explained with reference to FIG. 3.

Figure 2:
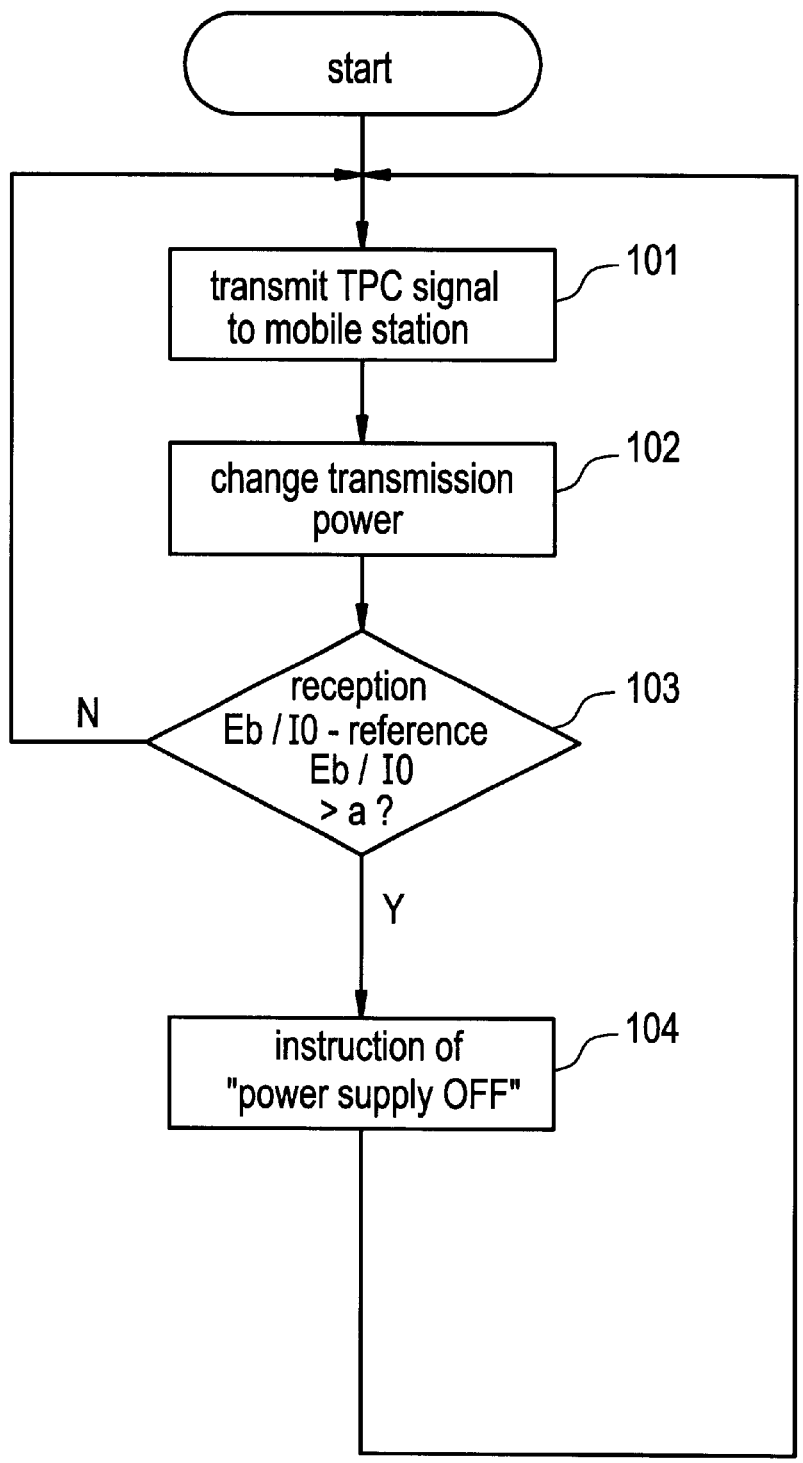
FIG. 2 is a flow chart showing the operation of a CDMA communication system according to a first embodiment of the present invention.

The present embodiment is a modification of the first embodiment shown in FIG. 2 in which step 105 has been substituted for step 104.

In this embodiment, if the difference between the reception Eb/I0 and reference Eb/I0 exceeds value "a" in step 103 and a particular mobile station is determined having a failure, base station 1 instructs mobile station $2_1$, which has failed to control of transmission power, to change the frequency used as the communication channel in step 105. This prevents the deterioration in communication quality for other normal mobile stations $2_2$–$2_n$ caused by transmission signals from mobile station $2_1$, in which transmission power control has been lost. This embodiment also solves the problem that battery life is shortened by the fact other normal mobile stations $2_2$–$2_n$ communicate at greater transmission power than is necessary, even when control of transmission power has become impossible in mobile station $2_1$.

Third Embodiment

A frequency control method in a CDMA communication system according to the third embodiment of the present invention will be described with reference to FIG. 4.

In the first and second embodiments, the output of an instruction from the base station to a mobile station that has failed to control of transmission power to turn off the power supply or to change frequency prevents deterioration in the communication quality of other normal mobile stations caused by transmission signals from the mobile station in which failure has occurred. Since mobile station $2_1$, in which control of transmission power has failed, is experiencing some form of failure, however, the output of an instruction from base station 1 does not necessarily mean that mobile station $2_1$ is controlled according to the instruction.

This embodiment enables prevention of deterioration of communication quality of other normal mobile stations $2_2$–$2_n$ caused by transmission signals from mobile station $2_1$ even when mobile station $2_1$ loses control of transmission power.

Figure 4:
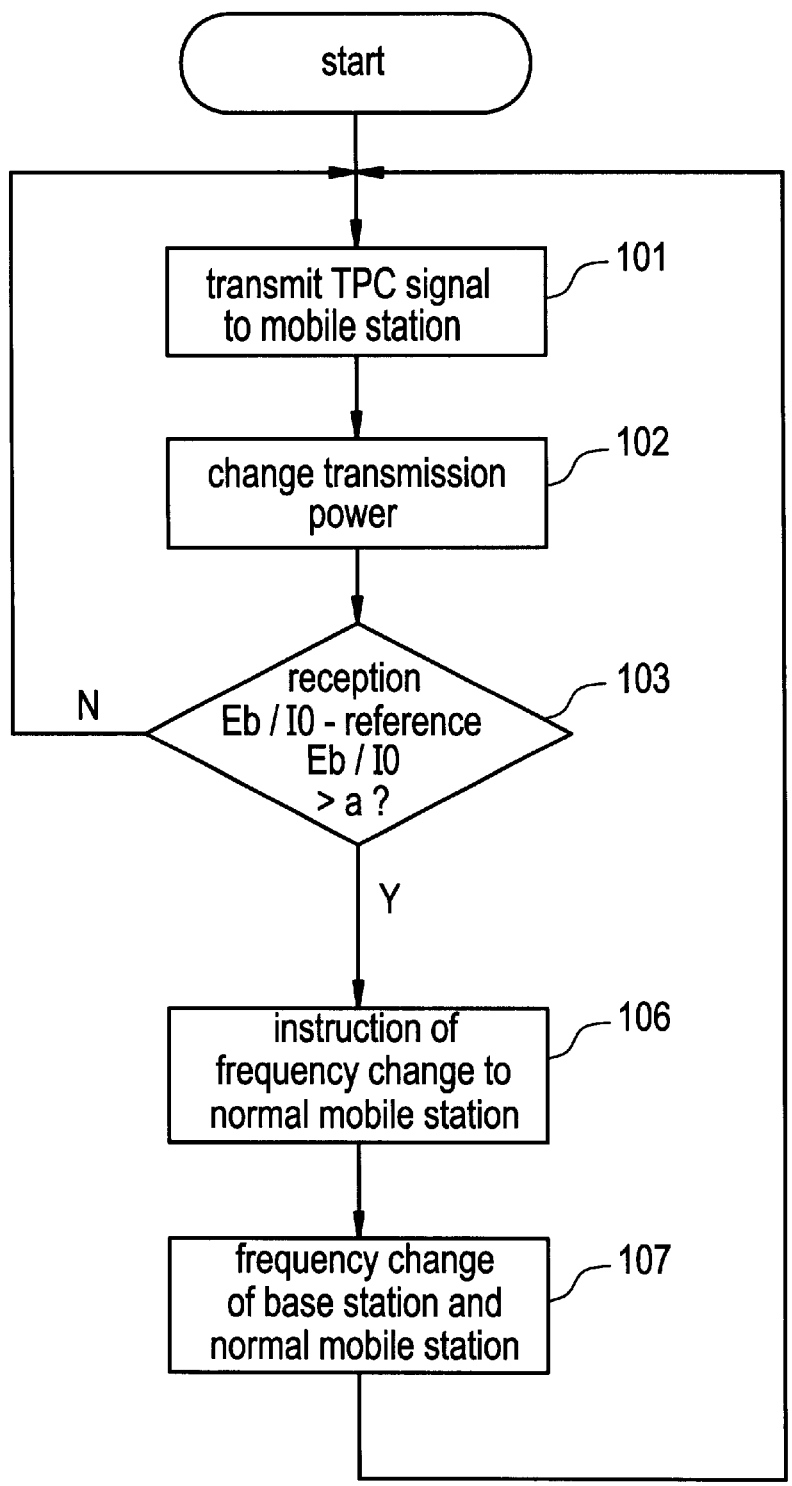
FIG. 4 is a flow chart showing the operation of a CDMA communication system according to a third embodiment of the present invention.

The flow chart of FIG. 4 is a modification of FIG. 2 in which steps 106 and 107 have been replaced for step 104.

Steps 101–103 are the same as those in FIG. 2, and explanations thereof will therefore be omitted.

In this embodiment, if the difference between reception Eb/I0 and reference Eb/I0 exceeds value "a" and a particular mobile station is determined to be experiencing a failure in step 103, base station 1 instructs normal mobile stations $2_2$–$2_n$ other than mobile station $2_1$, which has failed to control of transmission power, to change the frequency used as the communication channel in step 106. Then, in step 107, base station 1 and normal mobile stations $2_2$–$2_n$ switch each of frequencies used as the communication channel to another frequency.

This embodiment can thus prevent deterioration in the communication quality of other normal mobile stations $2_2$–$2_n$ caused by transmission signals from mobile station $2_1$, which has failed to control of transmission power, even when mobile station $2_1$ fails to accept control signals from base station 1. This embodiment also solves the problem that battery life is shortened by the fact other normal mobile stations $2_2$–$2_n$ communicate at greater transmission power than is necessary, even when control of transmission power has become impossible in mobile station $2_1$.

Fourth Embodiment

Figure 5:
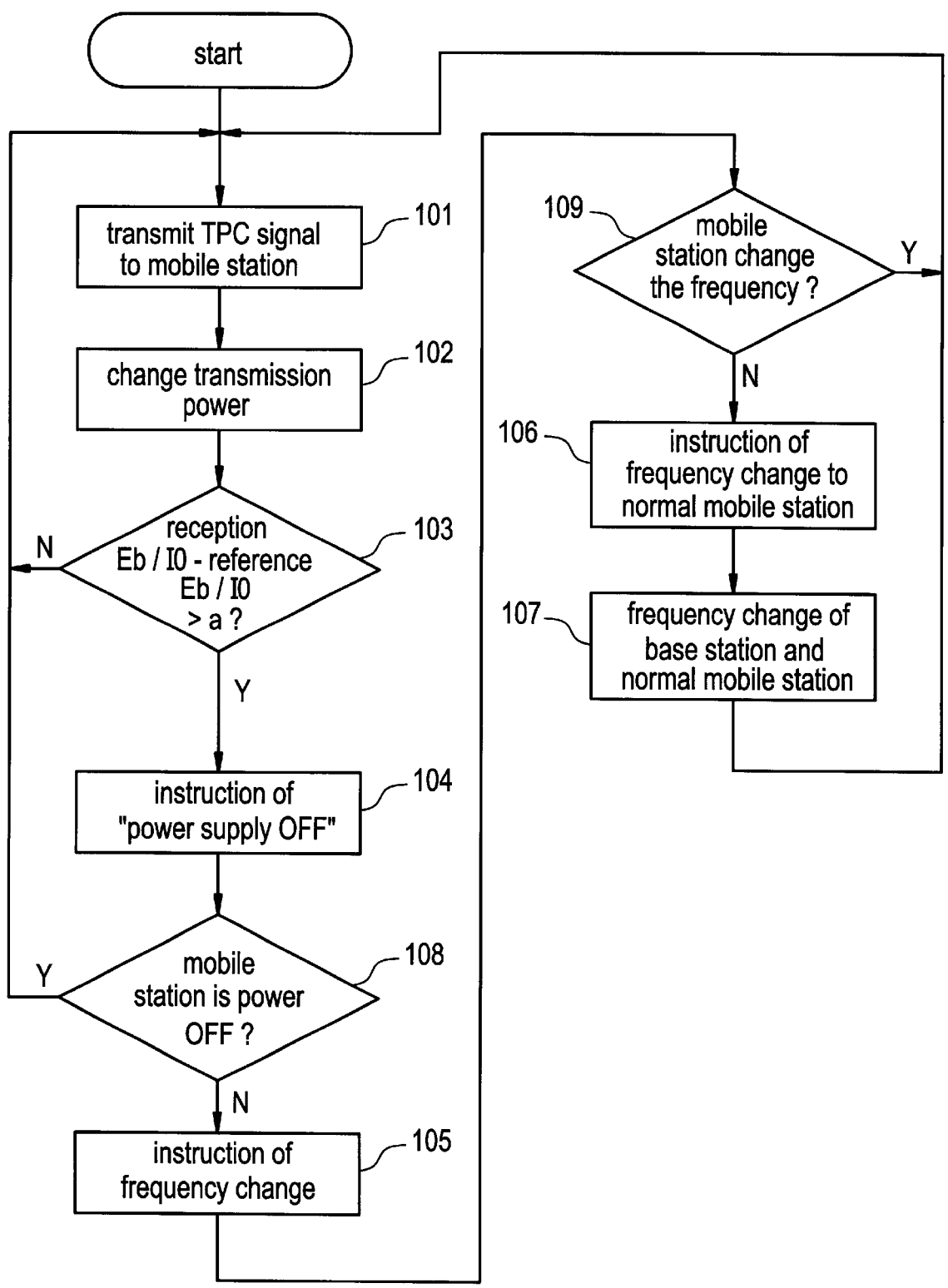
FIG. 5 is a flow chart showing the operation of a CDMA communication system according to a fourth embodiment of the present invention.

A frequency control method in a CDMA communication system according to the fourth embodiment of the present invention will be next explained with reference to FIG. 5, which is a flow chart illustrating the operation of the CDMA communication system.

The frequency control method of this embodiment is a combination of the frequency control methods in the above-mentioned first to third embodiments.

The frequency control method of this embodiment is identical to the frequency control method of the first to third embodiments as far as steps 101–103, and explanations thereof will therefore be omitted.

In this embodiment, if the difference between the reception Eb/I0 and reference Eb/I0 exceeds value "a" and a particular mobile station is determined to have failed in step 103, base station 1 sends an instruction in step 104 to mobile station $2_1$ that is determined to have lost control of transmission power to turn the power supply off.

Base station 1 then determines in step 108 whether or not the power supply of mobile station $2_1$ is confirmed to be turned of. If it is confirmed that the power supply of mobile station $2_1$ is turned off in step 108, base station 1 executes the processing of steps 101 and 102, in which transmission power is controlled as normal; but if base station 1 cannot confirm that the power supply of mobile station $2_1$ is turned off in step 108, base station 1 executes the processing of step 105. In step 105, base station 1 instructs mobile station $2_1$, which has failed to control of transmission power, to change the frequency used as the communication channel.

If the frequency change of mobile station $2_1$ can be confirmed in step 109, base station 1 then executes the processing of steps 101 and 102, in which normal transmission power control is carried out; but if the frequency change of mobile station $2_1$ cannot be confirmed in step 109, base station 1 executes step 106.

In step 106, base station 1 instructs normal mobile stations $2_2$–$2_n$ other than mobile station $2_1$, which has failed to control of transmission power, to change the frequency employed as the communication channel. In step 107, base station 1 and normal mobile stations $2_2$–$2_n$ then each switch the frequency employed as the communication channel to another frequency.

In this embodiment, if the power supply of mobile station $2_1$, in which a failure has occurred dose not turned off despite instructions from base station 1, the frequency used as the communication channel by that mobile station $2_1$ is changed; and if this change cannot be effected, the other normal mobile stations $2_2$–$2_n$ and base station 1 then change the frequency used as the communication channel to another frequency. Accordingly, the influence of transmission signals from mobile station $2_1$ can be prevented from causing deterioration in the communication quality of other normal mobile stations $2_2$–$2_n$ in which no problems have occurred by using a method according to the severity of the failure that has occurred in mobile station $2_1$, which has failed to control of transmission power. In addition, even when mobile station $2_1$ loses control of transmission power, the invention can solve the problem battery life shortened due to the fact that other normally operating mobile station $2_2$–$2_n$ communicate at greater transmission power than is necessary.

Although this embodiment uses a combination of all three frequency control methods in the above-described first to third embodiments, a combination of any two of the frequency control methods may also be used. For example, the method in which mobile station $2_1$, which has failed to control of transmission power, is instructed by base station 1 to turn off its power supply may be combined with the method in which the frequency of normal mobile stations $2_2$–$2_n$ is changed. In this case, the process of step 106 may be executed after the process of step 108 in the flow chart of FIG. 5.

In the aforementioned first to fourth embodiments, explanation has been presented regarding a case in which a failure occurs and control of transmission power is lost in only one mobile station $2_1$, but the present invention is not limited to such a case and may be similarly applied to cases in which failures occur and control of transmission power is lost in a plurality of mobile stations.

While preferred embodiments of the present invention have been described using specific terms, such description is for illustrative purposes only, and it is to be understood that changes and variations may be made without departing from the spirit or scope of the following claims.

What is claimed is:

1. A frequency control method in a CDMA communication system for controlling the frequency of a communication channel to be established between a CDMA base station and a plurality of mobile stations that communicate with said CDMA base station, comprising the steps of:

determining that a particular mobile station among said plurality of mobile stations has failed to control its transmission power when the difference between a reference Eb/I0 and reception Eb/I0 of a communication channel established between said particular mobile station and said CDMA base station exceeds a predetermined value; and instructing normal mobile stations other than said particular mobile station to change the frequency used as the communication channel to another frequency and changing the frequency used as communication channel to the frequency after said change.

2. A frequency control method in a CDMA communication system for controlling the frequency of a communication channel to be established between a CDMA base station and a plurality of mobile stations that communicate with said CDMA base station, comprising the steps of:

determining that a particular mobile station among said plurality of mobile stations has failed to control its transmission power when the difference between a reference Eb/I0 and reception Eb/I0 of a communication channel established between said particular mobile station and said CDMA base station exceeds a predetermined value; and instructing said particular mobile station to turn off its power supply, and if the power supply of said particular mobile station cannot be confirmed to be off, instructing normal mobile stations other than said particular mobile station to change the frequency used as the communication channel to another frequency and changing the frequency used as communication channel to the frequency after said change.

3. A frequency control method in a CDMA communication system for controlling the frequency of a communication channel to be established between a CDMA base station and a plurality of mobile stations that communicate with said CDMA base station, comprising the steps of:

determining that a particular mobile station among said plurality of mobile stations has failed to control its transmission power when the difference between a reference Eb/I0 and reception Eb/I0 of a communication channel established between said particular mobile station and said CDMA base station exceeds a predetermined value; and instructing said particular mobile station change the frequency used as the communication channel to another frequency, and if frequency change of said particular mobile station cannot be confirmed, instructing normal mobile stations other than said particular mobile station to change the frequency used as the communication channel to another frequency and changing the frequency used as communication channel to the frequency after said change.

4. A frequency control method in a CDMA communication system for controlling the frequency of a communication channel to be established between a CDMA base station and a plurality of mobile stations that communicate with said CDMA base station, comprising the steps of:

determining that a particular mobile station among said plurality of mobile stations has failed to control its transmission power when the difference between a reference Eb/I0 and reception Eb/I0 of a communication channel established between said particular mobile station and said CDMA base station exceeds a predetermined value; and instructing said particular mobile station to turn off its power supply, and if the power supply of said particular mobile station cannot be confirmed to be off, instructing said particular mobile station to change the frequency used as the communication channel to another frequency.

5. A frequency control method in a CDMA communication system for controlling the frequency of a communication channel to be established between a CDMA base station and a plurality of mobile stations that communicate with said CDMA base station, comprising the steps of:

determining that a particular mobile station among said plurality of mobile stations has failed to control its transmission power when the difference between a reference Eb/I0 and reception Eb/I0 of a communication channel established between said particular mobile station and said CDMA base station exceeds a predetermined value; and instructing said particular mobile station to turn off its power supply; and if the power supply of said particular mobile station cannot be confirmed to be off, instructing said particular mobile station to change the frequency used as the communication channel to another frequency; and if said frequency change of said particular mobile station cannot be confirmed, instructing normal immobile stations other than said particular mobile station to change the frequency used as the communication channel to another frequency and changing the frequency used as communication channel to the frequency after said change.

* * * * *